US012730572B2

(12) United States Patent
Ling

(10) Patent No.: US 12,730,572 B2
(45) Date of Patent: Sep. 8, 2026

(54) DATA PROCESSING METHOD, SYSTEM, AND APPARATUS, AND DEVICE

(71) Applicant: Huawei Technologies Co., Ltd., Shenzhen (CN)

(72) Inventor: Wenkai Ling, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 170 days.

(21) Appl. No.: 18/650,977

(22) Filed: Apr. 30, 2024

(65) Prior Publication Data

US 2024/0281159 A1 Aug. 22, 2024

Related U.S. Application Data

(63) Continuation of application No. PCT/CN2022/103671, filed on Jul. 4, 2022.

(30) Foreign Application Priority Data

Nov. 2, 2021 (CN) ......................... 202111286600.5
Jan. 25, 2022 (CN) ......................... 202210089391.3

(51) Int. Cl.
*G06F 3/06* (2006.01)

(52) U.S. Cl.
CPC .......... *G06F 3/0634* (2013.01); *G06F 3/0604* (2013.01); *G06F 3/0683* (2013.01)

(58) Field of Classification Search
CPC .... G06F 3/0634; G06F 3/0604; G06F 3/0683; G06F 16/903; G06F 9/4488; G06F 9/45533; G06F 9/45558; G06F 3/06; G06F 112/02
See application file for complete search history.

(56) References Cited

U.S. PATENT DOCUMENTS 10,620,868 B1 * 4/2020 Akaike ................. G06F 3/0665
11,487,465 B2 * 11/2022 Li ........................... G06F 3/064
11,544,001 B2 * 1/2023 Zhou ....................... G06F 3/067
2003/0189944 A1 * 10/2003 Chen ..................... H04L 12/403
370/413
2003/0202510 A1 10/2003 Witkowski et al.
2003/0221077 A1 * 11/2003 Ohno ...................... G06F 3/061
711/113
2007/0282927 A1 * 12/2007 Polouetkov ............. G06F 16/93
707/999.102
2017/0351438 A1 * 12/2017 Lee ....................... G06F 3/0679
2020/0364163 A1 11/2020 Schauer et al.

FOREIGN PATENT DOCUMENTS

CN 102750257 A 10/2012
CN 102841865 A 12/2012
CN 113259273 A 8/2021

* cited by examiner

*Primary Examiner* — Khoa D Doan
(74) *Attorney, Agent, or Firm* — Conley Rose, P.C.

(57) ABSTRACT

For a first device in a data processing system, a first object engine component is configured in the first device, and the first object engine component is coupled to a processor in the first device. The first object engine component processes a read instruction for a target object, selects an access destination of the read instruction based on an instruction type of the read instruction, and obtains the target object from the access destination.

20 Claims, 11 Drawing Sheets

First device

Memory

Processor (1)

(2)

Storage space

Object engine component

Network adapter

Target object

FIG. 10

DATA PROCESSING METHOD, SYSTEM, AND APPARATUS, AND DEVICE

CROSS-REFERENCE TO RELATED APPLICATIONS

This is a continuation of International Patent Application No. PCT/CN2022/103671 filed on Jul. 4, 2022, which claims priority to Chinese Patent Application No. 202210089391.3 filed on Jan. 25, 2022 and Chinese Patent Application No. 202111286600.5 filed on Nov. 2, 2021. All of the aforementioned patent applications are hereby incorporated by reference in their entireties.

TECHNICAL FIELD

This disclosure relates to the field of computer application technologies, and in particular, to a data processing method, system, and apparatus, and a device.

BACKGROUND

With the advent of the digital era and the popularization of the Internet, distributed storage systems have been widely developed. In a distributed storage system, data may be distributed on different nodes, and a same piece of data may be cached on different nodes. Each node is an independent physical device, for example, a server, or an independent virtualized running space, for example, a container or a virtual machine.

In some scenarios, when accessing data in the distributed storage system, a client may flexibly obtain cached data from a node that is close to the client, and return the data. However, there may be a problem that versions of data cached on nodes in the distributed storage system are inconsistent. For example, after the data is modified a plurality of times, a latest version of the data may be cached on some nodes, and an earlier version of the data may be cached on some other nodes. Different services have different data consistency requirements. For example, some services need to obtain the latest version of the data when accessing the data in the distributed storage system, for example, a bank transaction service. Some other services do not need to obtain the latest version of the data.

In some scenarios, to ensure that when accessing data in a distributed storage system, a client obtains data that satisfies a requirement (for example, obtains a latest version of the data), in a related technology, after obtaining the data, software running in a processor checks a data version based on a version number carried in the data. For example, a flag bit for indicating a version number is added to each piece of data in advance. When a node 1 receives data returned by a node 2, software running in a processor of the node 1 checks, based on the version number of the data, whether the data is a required version. If the check fails, the node 1 initiates a data access request again, to request to obtain data from another node. For another example, in another related technology, an independent management node is deployed in a distributed storage system, and the management node records global data version numbers. When a node 1 sends a data access request to the management node to apply for accessing data on a node 2, the management node controls the node 1 to access the node 2 based on a version number of the data when it is ensured that the data on the node 2 is a latest version.

However, the solutions of the related technologies make a data access process inflexible, and often lead to low data access efficiency.

SUMMARY

Embodiments of this disclosure provide a data processing method, system, and apparatus, and a device, to effectively improve data access efficiency. The technical solutions are as follows.

According to a first aspect, a data processing method is provided, applied to a data processing system. The data processing system includes a first device, the first device includes a first processor and a first object engine component, the first processor is coupled to the first object engine component, and the method includes the following.

The first object engine component receives a read instruction that is for a target object and that is sent by the first processor, where the read instruction includes an instruction type, the first object engine component selects an access destination of the read instruction based on the instruction type, and the first object engine component obtains the target object from the access destination.

The target object may be data of a text type, such as a travel record, a consumption record, or a sent message, or the object may be data of an image type or an audio/video type, or the target object is data of a web page type. This is not limited in this embodiment of this disclosure. For a first device in a data processing system, a first object engine component is configured in the first device, and the first object engine component is a hardware component coupled to a processor. The first object engine component can process a read instruction for a target object, select an access destination of the read instruction based on an instruction type of the read instruction, and obtain the target object from the access destination. Therefore, in a manner of improving underlying hardware on a computing device, a data access process of flexibly selecting an access destination based on an instruction type is implemented, and data access efficiency is effectively improved.

In some embodiments, the data processing system further includes a second device, the second device is a device that creates the target object, and when the instruction type is a first type, that the first object engine component selects an access destination of the read instruction based on the instruction type includes the following. The first object engine component selects the second device as the access destination of the read instruction based on the instruction type.

The read instruction includes an object identifier of the target object and a device identifier of the second device. That the instruction type is the first type means that the read instruction is strong-consistency read, and the instruction type of the strong-consistency read indicates that a target object read based on the read instruction needs to be a latest version of the target object. In this manner, when the instruction type of the read instruction is a type of the strong-consistency read, the first object engine component selects, based on the instruction type, the second device that creates the target object as the access destination, thereby ensuring that the finally obtained version of the target object is the latest version, and satisfying a strong-consistency read requirement.

In some embodiments, the data processing system further includes a second device, the second device is a device that creates the target object, and when the instruction type is a second type, that the first object engine component selects an access destination of the read instruction based on the instruction type includes the following. The first object engine component accesses a storage space of the first object engine component based on the instruction type, the first object engine component selects, if the target object is stored in the storage space of the first object engine component, the storage space of the first object engine component as the access destination of the read instruction, and the first object engine component selects, if the target object is not stored in the storage space of the first object engine component, the second device as the access destination of the read instruction.

The read instruction includes an object identifier of the target object and a device identifier of the second device. That the instruction type is the second type means that the read instruction is weak-consistency read, and the instruction type of the weak-consistency read indicates that a target object read based on the read instruction may be any version of the target object cached in the data processing system. In this manner, when the instruction type of the read instruction is a type of the weak-consistency read, the first object engine component first accesses its own storage space based on the instruction type, and selects, if the target object is stored in its own storage space, its own storage space as the access destination, or selects, if the target object is not stored in its own storage space, the second device that creates the target object as the access destination, thereby ensuring that the first device can obtain any version of the target object as soon as possible, and satisfying a weak-consistency read requirement.

The target object is obtained in different manners for read instructions of different instruction types, so that different consistency read levels can be configured for different services, thereby satisfying requirements of various services. In some embodiments, different consistency areas can be further configured for the data processing system based on different services. For example, a plurality of devices in the data processing system are configured as a first area, and the first area indicates that data access is performed between devices in the area based on the read instruction of the first type. A plurality of devices in the data processing system are configured as a second area, and the second area indicates that data access is performed between devices in the area based on the read instruction of the second type.

In some embodiments, the second device includes a second object engine component, and if the target object is not stored in the storage space of the first object engine component, the method further includes the following. The second object engine component receives the read instruction sent by the first object engine component, and the second object engine component queries object information of the target object based on the instruction type, obtaining the target object based on a found storage address of the target object in a storage space of the second engine component, and returning the target object to the first object engine component.

When the instruction type of the read instruction is the second type, the second object engine component obtains the target object from its own storage space based on the received read instruction, and returns the target object to the first object engine component, thereby shortening a cross-device data access path and improving data access efficiency.

In some embodiments, the second device includes a second object engine component, and the method further includes the following. The second object engine component receives the read instruction sent by the first object engine component, and the second object engine component queries object information of the target object based on the instruction type, obtaining the target object based on a found storage address of the target object in a memory of the second device, and returning the target object to the first object engine component.

When the instruction type of the read instruction is the first type, the second object engine component obtains the target object from the memory of the second device based on the received read instruction, and returns the target object to the first object engine component, thereby ensuring that the first device can obtain the latest version of the target object, and satisfying a strong-consistency read requirement.

In some embodiments, the second device includes a second object engine component, and the method further includes the following. The second object engine component receives an object registration instruction that is for the target object and that is sent by a second processor of the second device, where the object registration instruction instructs to register the target object with the second object engine component, and the second processor is coupled to the second object engine component, and the second object engine component records the object information of the target object in the second object engine component based on the object registration instruction, where the object information includes the storage address of the target object in the memory of the second device.

The second device registers the target object with the second object engine component. This process is a process in which the second device records the object information of the target object in the second object engine component. In this manner, when receiving the read instruction for the target object, the second object engine component can query the object information of the target object, thereby quickly obtaining the target object, to improve data access efficiency.

In some embodiments, the method further includes the following. The second object engine component obtains the target object from the memory of the second device, and storing the target object in a storage space of the second object engine, where the object information that is of the target object and that is recorded by the second object engine component further includes a storage address of the target object in the storage space of the second object engine component.

In this manner, the second object engine component stores the target object in its own storage space, so that when receiving the read instruction for the target object, the second object engine component can query the object information of the target object, thereby quickly obtaining the target object from its own storage space without processing by a processor, and improving data access efficiency.

In some embodiments, the method further includes the following. The first object engine component stores the target object obtained from the second device in the storage space of the first object engine component.

In this manner, the first object engine component can store the obtained target object in its own storage space in time, and therefore can obtain, when subsequently receiving the read instruction for the target object again, the target object directly from its own storage space, thereby improving data access efficiency.

In some embodiments, the first device and the second device belong to a same snoop group, the second device includes a second object engine component, and the method further includes the following. The second object engine component synchronizes a latest version of the target object to the first object engine component.

In this manner, the second device can synchronize the latest version of the target object to another device in a same snoop group, to implement an object status synchronization function, thereby ensuring data consistency between a plurality of devices in the data processing system.

In some embodiments, the first object engine component is disposed in a network adapter of the first device, or the first object engine component is disposed in an input/output (I/O) chip of the first device.

According to a second aspect, this disclosure provides a computing device. The computing device includes a processor and an object engine component, and the processor is coupled to the object engine component, the processor is configured to send a read instruction for a target object to the object engine component, where the read instruction includes an instruction type, the object engine component is configured to receive the read instruction, determine an access destination of the read instruction based on the instruction type, and obtain the target object from the access destination.

In some embodiments, the object engine component is further configured to, when the instruction type is a first type, select a second device as the access destination of the read instruction based on the instruction type, where the second device is a device that creates the target object.

In some embodiments, the object engine component is further configured to, when the instruction type is a second type, access a storage space of the first object engine component based on the instruction type, select, if the target object is stored in the storage space of the first object engine component, the storage space of the first object engine component as the access destination of the read instruction, and select, if the target object is not stored in the storage space of the first object engine component, a second device as the access destination of the read instruction, where the second device is a device that creates the target object.

In some embodiments, the object engine component is further configured to store the target object obtained from the second device in the storage space of the first object engine component.

In some embodiments, the object engine component is disposed in a network adapter of the computing device, or the object engine component is disposed in an I/O chip of the computing device.

According to a third aspect, this disclosure provides a computing device, including a processor, a memory, and an object engine component. The processor is coupled to the object engine component, and the object engine component is configured to receive a read instruction that is for a target object and that is sent by a request device, based on an instruction type of the read instruction, obtain the target object from a storage space of the object engine component, or obtain the target object from the memory, and return the target object to an object engine component of the request device.

In some embodiments, the object engine component is configured to, when the instruction type is a first type, query object information of the target object, and obtain the target object from the memory based on a found storage address of the target object in the memory, or when the instruction type is a second type, query object information of the target object, and obtain the target object from the storage space of the engine component based on a found storage address of the target object in the storage space of the engine component.

In some embodiments, the object engine component is further configured to receive an object registration instruction that is for the target object and that is sent by the processor, where the object registration instruction instructs to register the target object with the object engine component, and record the object information of the target object in the object engine component based on the object registration instruction, where the object information includes the storage address of the target object in the memory of the computing device.

In some embodiments, the object engine component is further configured to obtain the target object from the memory of the computing device, and store the target object in the storage space of the object engine, where the object information that is of the target object and that is recorded by the object engine component further includes the storage address of the target object in the storage space of the object engine component.

In some embodiments, the computing device belongs to a snoop group, the snoop group further includes another computing device, and the object engine component is further configured to synchronize a latest version of the target object to an object engine component in the other computing device in the snoop group.

According to a fourth aspect, this disclosure provides a data processing system, including a first device and a second device. The first device is configured to implement a function of the computing device according to the second aspect or any possible implementation of the second aspect, and the second device is configured to implement a function of the computing device according to the third aspect or any possible implementation of the third aspect.

According to a fifth aspect, this disclosure provides a data processing apparatus. The data processing apparatus includes a communication interface and a processing unit, the communication interface is configured to exchange an instruction, and the processing unit is configured to implement a function of an object engine component of the computing device according to the second aspect or any possible implementation of the second aspect, or the processing unit is configured to implement a function of an object engine component of the computing device according to the third aspect or any possible implementation of the third aspect.

According to a sixth aspect, this disclosure provides a computer-readable storage medium. The computer-readable storage medium is configured to store at least one segment of program code, and the at least one segment of program code is used to implement a function of the computing device according to the second aspect or any possible implementation of the second aspect, or the at least one segment of program code is used to implement a function of the computing device according to the third aspect or any possible implementation of the third aspect. The storage medium includes but is not limited to a volatile memory, for example, a random-access memory (RAM), or a nonvolatile memory, such as a flash memory, a hard disk drive (HDD), and a solid-state drive (SSD).

According to a seventh aspect, this disclosure provides a computer program product. The computer program product includes computer program code. When the computer program code is executed by a computing device, the computing device implements a function of the computing device according to the second aspect or any possible implementation of the second aspect, or the computing device implements a function of the computing device according to the third aspect or any possible implementation of the third aspect. The computer program product may be a software installation package. When a function of the foregoing computing device needs to be implemented, the computer program product may be downloaded and executed on the computing device.

BRIEF DESCRIPTION OF DRAWINGS

FIG. 10 is a schematic diagram of another object read instruction processing process according to an embodiment of this disclosure;

DESCRIPTION OF EMBODIMENTS

To make the objectives, technical solutions, and advantages of this disclosure clearer, the following further describes the implementations of this disclosure in detail with reference to the accompanying drawings.

The following describes an implementation environment of this disclosure.

Figure 1:
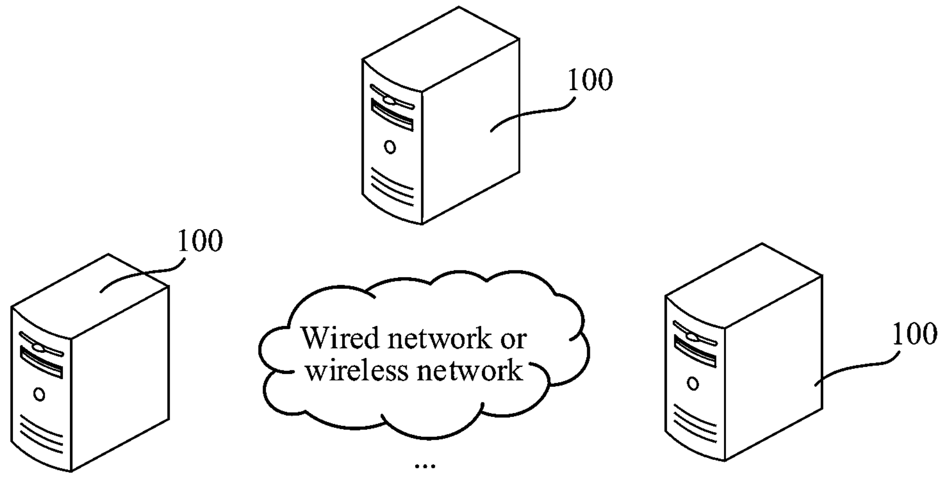
FIG. 1 is a schematic diagram of an implementation environment.

FIG. 1 is a schematic diagram of an implementation environment. As shown in FIG. 1, the implementation environment includes a plurality of devices 100. The devices are directly or indirectly connected by using a wired network or a wireless network. This is not limited herein. In some embodiments, the plurality of devices 100 are also referred to as a plurality of nodes 100 or a plurality of computing devices 100.

The plurality of devices 100 may be applied to a distributed storage system having a cross-device data access function, and are configured to provide a data service. For example, the distributed storage system is a distributed key-value (KV) system, a KV-based multi-copy storage system, or the like. Any one of the plurality of devices 100 can store at least one object. In some embodiments, a plurality of copies of a same object are respectively stored on different devices. It should be noted that an object in this disclosure is also referred to as a data object, and refers to an element of any data structure referenced in an application on which a service runs, for example, a file, data, or a variable. A data type of an object is not limited in this embodiment of this disclosure. For example, the object is data of a text type, such as a travel record, a consumption record, or a sent message, or the object is of an image type or an audio type, or the object is data of a web page type.

In some embodiments, the device 100 is a device that has both a computing capability and a storage capability, for example, a server or a desktop computer. The device 100 may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. It should be noted that the figure is merely an example. There may be more or fewer devices 100. This is not limited in this embodiment of this disclosure.

For example, in some scenarios, the plurality of devices 100 are applied to a distributed KV system. When accessing an object in the distributed KV system, a client sends a data read request for the object to a device 1. When the object is stored on the device 1, the device 1 returns the object to the client, or when the object is not stored on the device 1, or a version of the object stored on the device 1 is unqualified (for example, the version of the object is not a latest version), the device 1 sends the read instruction to a device 2 that creates the object, obtains the object from the device 2, and returns the object to the client, to implement cross-device data access.

In some embodiments, a standard communication technology and/or protocol is used for the wireless network or the wired network described above. The network is usually a Transmission Control Protocol (TCP)/Internet Protocol (IP) network or a remote direct memory access (RDMA) network such as an RDMA over Converged Ethernet (RoCE) network or an infinite bandwidth (IB) network in a data center network. This is not limited. In some other embodiments, customized and/or dedicated data communication technologies can be further used in place of or in addition to the foregoing data communication technologies.

The following describes a hardware structure of any device in the foregoing implementation environment.

Figure 2:
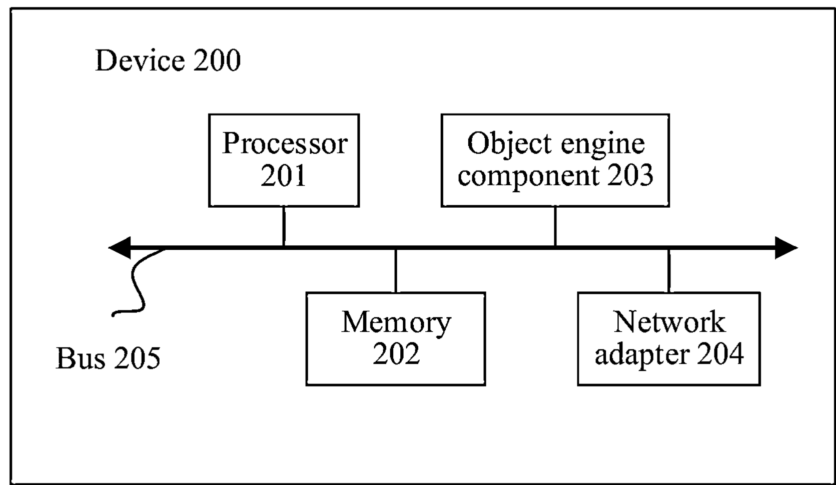
FIG. 2 is a schematic diagram of a hardware structure of a device according to an embodiment of this disclosure.

FIG. 2 is a schematic diagram of a hardware structure of a device according to an embodiment of this disclosure. As shown in FIG. 2, the device 200 includes a processor 201, a memory 202, an object engine component 203, a network adapter 204, and a bus 205. The processor 201, the memory 202, the object engine component 203, and the network adapter 204 implement communication connections with each other by using the bus 205.

In some embodiments, the processor 201 may be a central processing unit (CPU), and is configured to process an object read/write instruction from outside the device 200, and also configured to process an instruction generated inside the device 200. When receiving an object write instruction from outside, the processor 201 may first store an object corresponding to the object write instruction in the memory 202. When receiving an object read instruction that needs to perform cross-device access, the processor 201 may send the read instruction to the object engine component 203, so as to obtain a corresponding object from another device. In some embodiments, the processor 201 is a single-core processor or a multi-core processor. This is not limited in this embodiment of this disclosure. In some embodiments, one or more processors 201 may be included, and these processors may include a single-core processor and/or a multi-core processor. In some embodiments, the processor 201 refers to one or more devices, circuits, and/or processing cores configured to process data (for example, a computer program instruction). In some embodiments, the processor 201 is an application-specific integrated circuit (ASIC), an integrated circuit configured to control program execution of the solutions of this disclosure, or the like. This is not limited in this embodiment of this disclosure.

The memory 202 may be an internal memory that directly exchanges data with the processor 201, can read/write data at any time at a very high speed, and is used as a temporary data memory of an operating system or another running program. In some embodiments, the memory 202 is a read-only memory (ROM) or another type of static storage device capable of storing static information and instructions, a RAM or another type of dynamic RAM (DRAM) capable of storing information and instructions, or may be an electrically erasable programmable ROM (EEPROM), a compact disc (CD) ROM (CD-ROM), or other CD storage or optical disc storage (including a compact disc, a laser disc, an optical disc, a DIGITAL VERSATILE DISC (DVD), a BLU-RAY disc, and the like), a magnetic disk storage medium or another magnetic storage device, or any other medium capable of carrying or storing expected program code in a form of instructions or data structures and capable of being accessed by a computer, but is not limited thereto. The memory 202 may store at least one segment of program code. When the program code stored in the memory 202 is executed by the processor 201, the processor 201 is configured to perform steps related to the processor 201 in the following method embodiments.

The processor 201 and the memory 202 may be disposed separately, or may be integrated together.

The object engine component 203 may be a chip (or die) coupled to the processor 201, and is configured to process an instruction sent by the processor 201, and also configured to receive and process an instruction sent by an object engine component of another device. In some embodiments, the object engine component 203 further includes a memory configured to provide a storage space for the object engine component 203. For example, the object engine component 203 can store an obtained object in the storage space. For example, the memory is a RAM, a DRAM, or the like (a specific hardware structure of the object engine component 203 is described in FIG. 3 subsequently, and details are not described herein again).

It should be understood that the object engine component 203 and the network adapter 204 may be disposed separately, as shown in FIG. 2. In some embodiments, the object engine component 203 and the network adapter 204 may alternatively be integrated together. For example, the object engine component 203 may be integrated into the network adapter 204. In this case, the network adapter 204 includes the object engine component 203. In some embodiments, the device 200 may further include an I/O chip, and the object engine component 203 can be integrated into the I/O chip. A location of the object engine component 203 is not limited in this embodiment of this disclosure.

The network adapter 204 is configured to communicate with another communication device. In some embodiments, the network adapter 204 can implement an RDMA function. RDMA is a technology in which data in a memory of a remote host is accessed without using a kernel of an operating system of the remote host. Because the operating system is not used, not only a large quantity of CPU resources is saved, but also a throughput of a system is improved and a network communication delay of the system is reduced.

The bus 205 is used for communication between components inside the device 200.

In the device shown in FIG. 2, the object engine component is configured. The object engine component can process an instruction sent by the processor, and can also receive and process an instruction sent by an object engine component of another device. Therefore, in some scenarios, when the device receives a read instruction for an object, the object engine component can process the read instruction (for example, directly obtain an object from its own storage space and return the object, or obtain an object from an object engine component of another device and return the object) without using a processor, so that the object engine component undertakes some operation work of the processor in the device. Not only overheads caused by performing the foregoing operations by software on the processor are reduced, but also data access efficiency is improved by processing the data read instruction with dedicated hardware.

Figure 3:
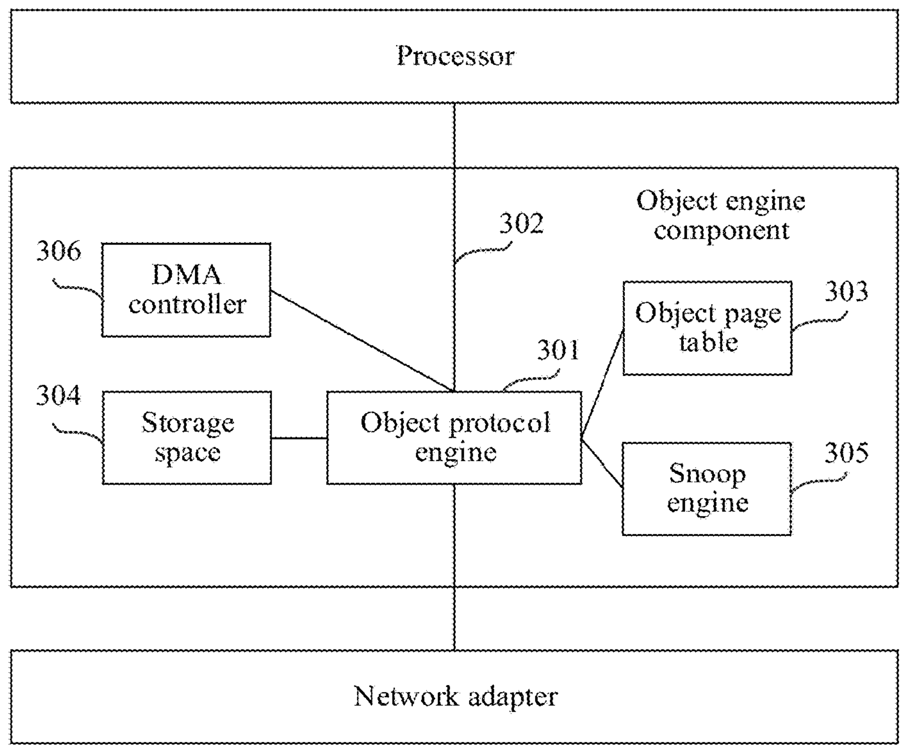
FIG. 3 is a schematic diagram of a hardware structure of an object engine component according to an embodiment of this disclosure.

The following describes the hardware structure of the object engine component in the foregoing device based on FIG. 3.

FIG. 3 is a schematic diagram of a hardware structure of an object engine component according to an embodiment of this disclosure. It should be understood that FIG. 3 is merely an example of a schematic structural diagram of an object engine component. Division of parts in the object engine component is not limited in this disclosure. As shown in FIG. 3, the object engine component includes an object protocol engine 301 and a bus 302. In some embodiments, the object engine component may further include an object page table 303, a storage space 304, a snoop engine 305, a direct memory access (DMA) controller 306, and the like. This is not limited in this embodiment of this disclosure. The following uses any device in the implementation environment shown in FIG. 1 as an example to describe a hardware structure of an object engine component of the device.

The object protocol engine 301 is a core engine of the object engine component, and is configured to implement an object read instruction processing function, an object registration function, and an object status synchronization function. The following briefly describes these functions.

The object read instruction processing function refers to receiving a read instruction that is for an object and that is sent by a processor, where the read instruction includes an instruction type, selecting an access destination of the read instruction based on the instruction type, and obtaining the object from the access destination. The object refers to any object that the device needs to obtain. In some embodiments, the access destination is a storage space of the object engine component. In some other embodiments, the access destination is another device that creates the object. This process is described in a subsequent method embodiment, and details are not described herein.

The object registration function refers to receiving an object registration instruction that is for an object and that is sent by the processor, where the object registration instruction instructs to register the object with the object engine component, and recording object information of the object in the object engine component based on the object registration instruction, where the object information includes a storage address of the object in a memory of the device. The object refers to any object created by the device. In some embodiments, the object engine component of the device registers an object by using the object registration function, indicating that the device has functions of modifying and reading the object. In some embodiments, after the object engine component of the device registers an object by using the object registration function, the object engine component can query, when receiving a read instruction that is for the object and that is sent by another device, object information of the object, obtain the object based on a found storage address of the object, and return the object to the other device.

The object status synchronization function means that the device belongs to a snoop group, and the object engine component synchronizes a latest version of an object to an object engine component in another device in the snoop group. The object refers to any object created by the device. The device synchronizes, by using the object status synchronization function of the object engine component, a latest version of a created object to another device in a snoop group, so that the other device determines whether to update the object based on its own requirement, thereby ensuring data consistency between devices in the same snoop group.

The bus 302 is used for communication between parts inside the object engine component. For example, the device shown in FIG. 2 is used as an example. The bus 302 is further used for communication between the object engine component and the processor, and communication between the object engine component and the network adapter.

The object page table 303 is used to record object information of an object registered with the object engine component. In some embodiments, the object page table 303 is implemented by using a memory, for example, a RAM or a DRAM. This is not limited in this embodiment of this disclosure.

The storage space 304 refers to an internal memory that directly exchanges data with the object protocol engine 301, and is used as a temporary data memory of the object engine component, for example, a RAM or a DRAM. This is not limited in this embodiment of this disclosure. In some embodiments, the storage space is used to store an object. In some embodiments, the storage space 304 stores at least one segment of program code. When the program code stored in the storage space 304 is executed by the object protocol engine 301, the object protocol engine 301 is configured to perform steps related to an object engine component in the following method embodiments.

In some embodiments, the object page table 303 and the storage space 304 are implemented by using a same memory. This is not limited in this embodiment of this disclosure. It should be understood that the object protocol engine 301, the object page table 303, and the storage space 304 may be disposed separately, as shown in FIG. 3, for example, implemented by using a plurality of chips. In some embodiments, the object protocol engine 301, the object page table 303, and the storage space 304 are integrated together, for example, integrated into a same chip. This is not limited.

The snoop engine 305 is configured to send a status synchronization instruction to the object protocol engine 301, so that the object protocol engine 301 synchronizes a latest version of an object to an object engine component in another device in the snoop group. In some embodiments, the object protocol engine 301 and the snoop engine 305 are disposed separately or integrated together, for example, implemented by using different chips or integrated into a same chip. This is not limited in this embodiment of this disclosure.

The DMA controller 306 is configured to directly read/write a memory of the device. When needing to store an object, the object engine component obtains the object from the memory of the device without intervention of the processor.

By using the parts of the object engine component shown in FIG. 3, the object engine component provided in this embodiment of this disclosure can process a read instruction for an object, select an access destination of the read instruction based on an instruction type of the read instruction, and obtain the target object from the access destination. Therefore, in a manner of innovating underlying hardware, a data access process of flexibly selecting an access destination based on an instruction type is implemented, and data access efficiency is effectively improved. In addition, cross-device data access is implemented in this manner of innovating underlying hardware, so that the device can sense a status of the object in real time, thereby improving data access efficiency while effectively releasing computing power of a CPU.

Based on FIG. 1 to FIG. 3, an implementation environment of this disclosure and a hardware structure of any device in the implementation environment are described. A data processing method provided in this disclosure is described in detail below.

Figure 4:
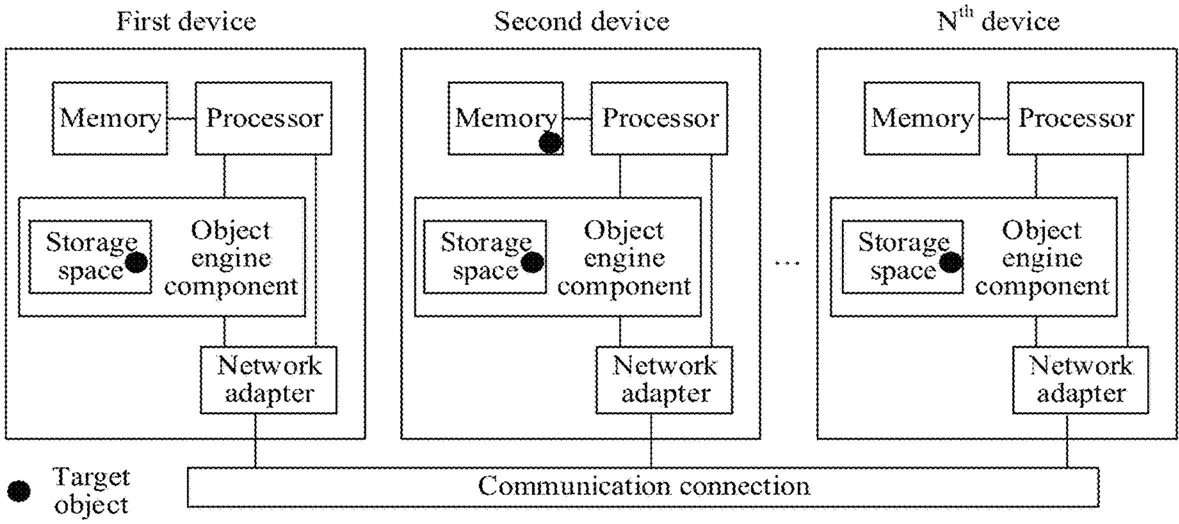
FIG. 4 is a schematic diagram of an application scenario according to an embodiment of this disclosure.

For example, the data processing method provided in embodiments of this disclosure can be applied to a data processing system. FIG. 4 is a schematic diagram of an application scenario according to an embodiment of this disclosure. As shown in FIG. 4, the application scenario is a data processing system. The data processing system includes a plurality of devices: a first device, a second device, . . . , and an $N^{th}$ device (N is a positive integer). Each device includes a processor, a memory, and an object engine component. The devices are directly or indirectly connected by using a wired network or a wireless network. This is not limited herein.

For example, the first device includes a first processor and a first object engine component, and the first processor is coupled to the first object engine component, and the second device includes a second processor and a second object engine component, and the second processor is coupled to the second object engine component. As shown in FIG. 4, the second device is a device that creates a target object, and the target object is any object stored in a memory of the second device. That is to say, the second device has functions of modifying and reading the target object.

In some embodiments, the second object engine component can register the target object with the second object engine component, that is, record object information of the target object in the second object engine component, and store the target object in a storage space of the second object engine component. In some embodiments, the second device is also referred to as an owner node of the target object. The object information of the target object is recorded in the second object engine component, so that when receiving a read instruction that is for the target object and that is sent by an object engine component of another device, the second object engine component obtains the target object by querying the object information of the target object and returns the target object, to improve data access efficiency.

In some embodiments, when receiving a read instruction for the target object, an object engine component of another device different from the second device in the data processing system can select, based on an instruction type of the read instruction, the second device as an access destination of the read instruction, and obtain the target object from the second device.

In some embodiments, object engine components of other devices different from the second device in the data processing system can store the target object obtained from the second device in storage spaces of their respective object engine components. For example, the first device is used as an example. When processing a read instruction for the target object, the first object engine component stores the target object obtained from the second device in the storage space of the first object engine component. In another example, that the first device and the second device belong to a same snoop group is used as an example. The second object engine component synchronizes the latest version of the target object to the first object engine component, so that the first object engine stores the received latest version of the target object in the storage space of the first object engine component. This process may also be understood as a process in which the second device implements object status synchronization, thereby ensuring data consistency between a plurality of devices in the data processing system. In addition, in this manner, when a plurality of devices in the data processing system need to perform cross-device data access, data exchange can be performed by using their respective object engine components of the devices, thereby increasing a speed of data access between the devices, reducing software overheads, and improving data access efficiency.

Figure 5:
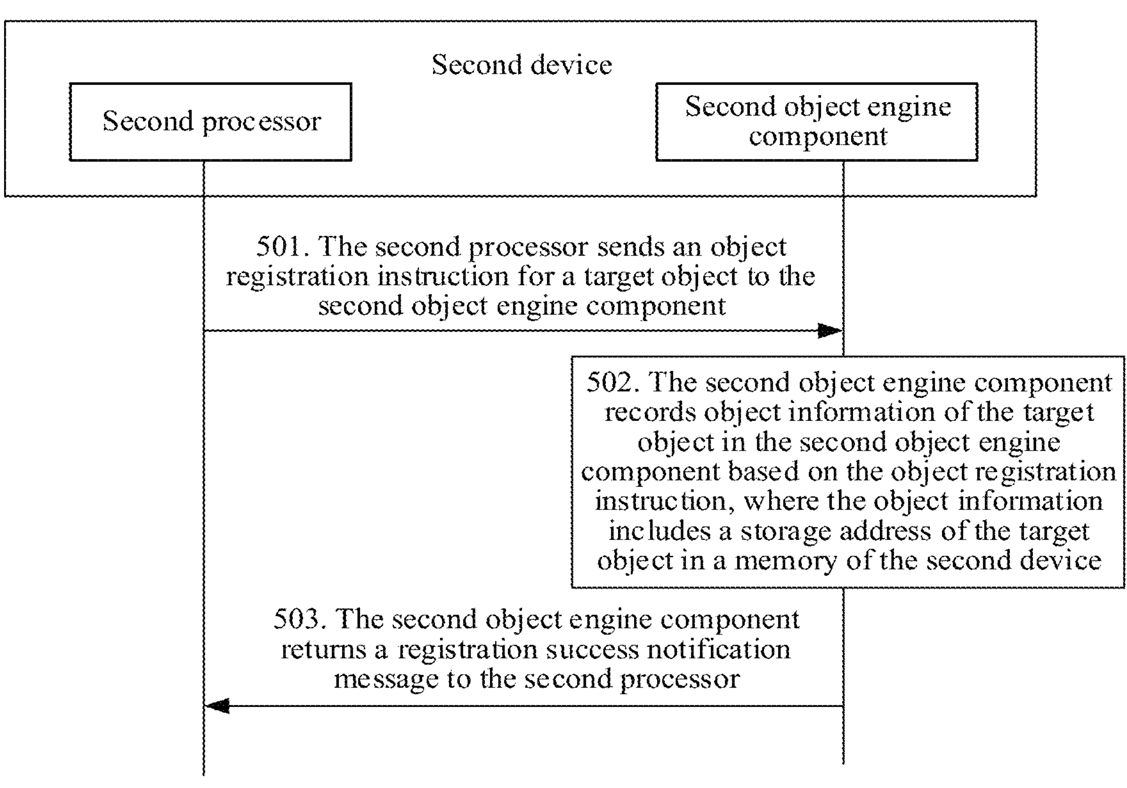
FIG. 5 is a flowchart of a method for registering a target object according to an embodiment of this disclosure.

Referring to FIG. 5, the following describes a process in which the second object engine component of the second device registers the target object with the application scenario shown in FIG. 4.

FIG. 5 is a flowchart of a method for registering a target object according to an embodiment of this disclosure. As shown in FIG. 5, interaction between the second processor and the second object engine component in the second device is used as an example for description. The target object is registered with the second object engine component, so that when receiving a read instruction that is for the target object and that is sent by an object engine component of another device, the second object engine component obtains the target object by querying the object information of the target object and returns the target object, to improve data access efficiency. For example, the method for registering a target object includes the following step 501 to step 503.

501. The second processor sends an object registration instruction for a target object to the second object engine component, where the object registration instruction instructs to register the target object with the second object engine component.

In this embodiment of this disclosure, the target object refers to any object that is stored in a memory of the second device, and the object registration instruction includes a storage address of the target object in the memory of the second device. In some embodiments, when storing the target object in the memory, the second processor sends the object registration instruction for the target object to the second object engine component. In some other embodiments, the second processor sends, at intervals of target duration (which is set based on an actual requirement and is not limited) and based on a plurality of objects stored in the memory within the target duration, object registration instructions for the plurality of objects to the second object engine component. The object registration instructions for the plurality of objects include the object registration instruction for the target object. An occasion on which the second processor sends the object registration instructions is not limited in this embodiment of this disclosure.

In some embodiments, the object registration instruction further includes an instruction identifier, an object identifier of the target object, a version number of the target object, and the like. This is not limited in this embodiment of this disclosure. The instruction identifier is used to identify the object registration instruction (which may also be understood as a function of distinguishing the instruction), and the version number of the target object indicates a current version of the target object.

In some embodiments, the object registration instruction further includes a first flag bit, and the first flag bit indicates whether the second object engine component is allowed to store the target object. For example, a field name of the first flag bit is "is_cached". When the first flag bit is 1, it indicates that the second object engine component is allowed to store the target object. When the first flag bit is 0, it indicates that the second object engine component is not allowed to store the target object. In this manner, the second object engine component determines, based on the object registration instruction, whether the target object needs to be stored, and stores the target object in the storage space of the second object engine component when the target object is allowed to be stored, or records a storage address of the target object in the memory of the second device when the target object is not allowed to be stored.

For example, referring to Table 1, the following describes content of the object registration instruction by using an example in which the object registration instruction further includes an instruction identifier, an object identifier of the target object, a version number of the target object, and a first flag bit.

TABLE 1

| opcode (Instruction identifier) | object_id (Object identifier) | host_addr_ptr (Storage address in a memory) | version (Version number) | is_cached (First flag bit) |
|---|---|---|---|---|
| create_obj | 0001 | base/1234/123 | 01 | 1 |

opcode is an instruction identifier, for example, create_obj (object registration instruction), object_id is an object identifier of the target object, for example, 0001, host_addr_ptr is a storage address of the target object in the memory, for example, base/1234/123, version is a version number of the target object, for example, 01, and is_cached is a field name of the first flag bit, for example, the first flag bit is 1. It should be noted that Table 1 is merely an example. In some embodiments, the object registration instruction may further include other content, or content in the instruction is represented in another manner. This is not limited in this embodiment of this disclosure.

502. The second object engine component records object information of the target object in the second object engine component based on the object registration instruction, where the object information includes a storage address of the target object in a memory of the second device.

In this embodiment of this disclosure, the second object engine component records the object information of the target object in the second object engine component based on the object registration instruction and the storage address of the target object in the memory of the second device, where the object information includes the storage address of the target object in the memory of the second device. In some embodiments, the second object engine component records the object information of the target object in the object page table of the second object engine component (referring to FIG. 3, details are not described herein again).

In some embodiments, the second object engine component obtains the target object from the memory of the second device based on the object registration instruction, and stores the target object in the storage space of the second object engine component. For example, the object information that is of the target object and that is recorded by the second object engine component further includes a storage address of the target object in the storage space of the second object engine component. In this manner, the second object engine component can store the target object in its own storage space while recording the object information of the target object, and therefore directly obtains, when receiving a read instruction that is for the target object and that is from another device, the target object from its own storage space, thereby effectively increasing a speed of data access between devices in the data processing system and improving data access efficiency.

In some embodiments, when the object registration instruction further includes a first flag bit, and the first flag bit indicates that the second object engine component is allowed to store the target object, the second object engine component obtains the target object from the memory of the second device based on the object registration instruction, and stores the target object in the storage space of the second object engine component. In this manner, the second object engine component can store the target object in its own storage space when recording the object information of the target object, to store the object in a targeted manner, that is, store the target object when a service allows the target object to be stored, to satisfy requirements of different services.

For example, referring to Table 2, the following describes the object information that is of the target object and that is recorded in the second object engine component by using an example in which the object registration instruction further includes an instruction identifier, an object identifier of the target object, a version number of the target object, and a first flag bit.

TABLE 2

| vld (Valid bit) | object_id (Object identifier) | owner (Owner node) | host_addr_ptr (Storage address in a memory) | is_cached (First flag bit) | cache_addr (Storage address in a storage space) | version (Version number) |
|---|---|---|---|---|---|---|
| | 0001 | Second device | base/1234/123 | 1 | xxxx | 01 |

vld represents a valid bit, object_id is an object identifier of the target object, owner represents that the target object is created by using a local device, that is, the second device is an owner node of the target object, and the second device has functions of modifying and reading the target object, host_addr_ptr is a storage address of the target object in the memory of the second device, is_cached is the first flag bit, cache_addr is a storage address of the target object in the storage space of the second object engine component, and version is a version number of the target object. It should be noted that Table 2 is merely an example. In some embodiments, the object information of the target object may further include other content, or content in the object information is represented in another manner. This is not limited in this embodiment of this disclosure.

503. The second object engine component returns a registration success notification message to the second processor.

Figure 6:
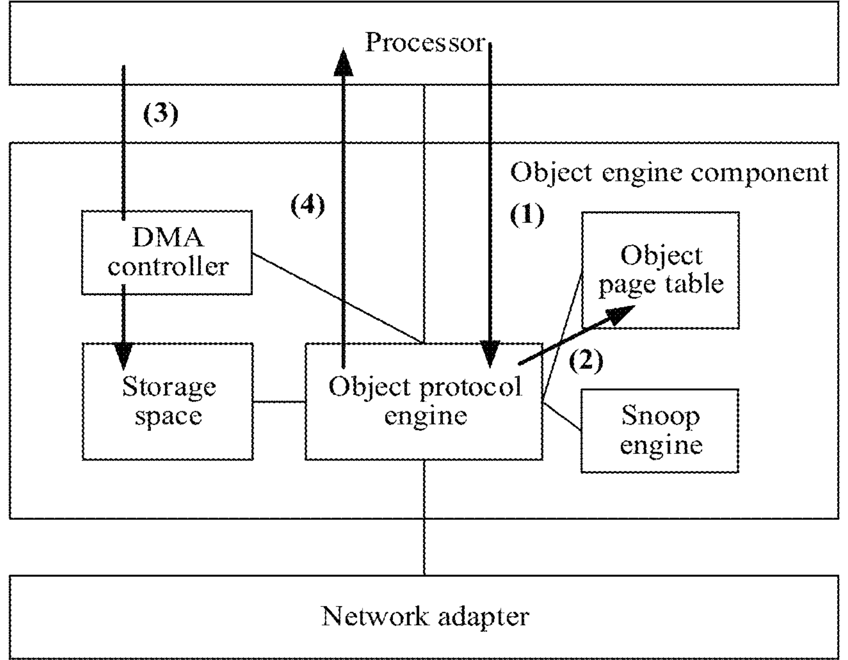
FIG. 6 is a schematic diagram of a process of registering a target object according to an embodiment of this disclosure.

Through the foregoing step 501 to step 503, the process of registering the target object with the second object engine component of the second device is described. The following describes an example of this process with reference to the schematic diagram of the hardware structure of the object engine component shown in FIG. 3. For example, FIG. 6 is a schematic diagram of a process of registering a target object according to an embodiment of this disclosure. As shown in FIG. 6, that the second object engine component stores the target object in the storage space of the second object engine component is used as an example. The process of registering a target object includes the following several steps: (1) A second processor sends an object registration instruction for a target object to a second object engine component. (2) The second object engine component records object information of the target object in the second object engine component based on the object registration instruction. For example, this process is performed by an object protocol engine in the second object engine component, and the object information of the target object is recorded in an object page table of the second object engine component. (3) The second object engine component obtains the target object from a memory of a second device, and stores the target object in a storage space of the second object engine component. For example, this process is performed by a DMA controller of the second object engine component. (4) The second object engine component returns a registration success notification message to the second processor.

In addition, in some embodiments, the second processor may further send an object update instruction and an object deletion instruction for the target object to the second object engine component, to control the second object engine component to update the object information of the target object and delete the object information of the target object. For example, an object update instruction is used as an example. The object update instruction instructs to update the object information of the target object in the second object engine component. When the version of the target object is updated, the second processor sends the object update instruction to the second object engine component, and the second object engine component updates the object information of the target object in the second object engine component based on the object update instruction. The object update instruction includes the version number of the target object, and the second object engine component updates, in the second object engine component, the version number in the object information of the target object. In some embodiments, when the second object engine component stores the target object, the second object engine component updates the version of the target object in the storage space of the second object engine component based on the object update instruction. It should be noted that a process of processing the object update instruction and the object deletion instruction by the second object engine component is similar to the foregoing process of processing the object registration instruction. Therefore, details are not described herein again.

FIG. 5 and FIG. 6 show a process in which the second device registers the target object with the second object engine component of the second device. In this manner, when receiving a read instruction that is for the target object and that is from another device in the data processing system, the second device can quickly obtain the target object by querying the object information of the target object in the second object engine component, and return the target object to the other device, thereby increasing a speed of data access between devices and improving data access efficiency. Further, when the target object is stored in the storage space of the second object engine component, the target object can be directly obtained by using the second object engine component, and returned to another device, thereby greatly increasing a speed of data access between devices, and further improving data access efficiency.

It should be understood that for the foregoing described process of registering a target object, although this embodiment of this disclosure is described in detail by using only the second device as an example, actually, any device in the data processing system, for example, the first device or the $N^{th}$ device, may register an object created by the device with an object engine component in the device by using a same method as the foregoing method, so that when another device accesses the registered object, the object engine component performs query to quickly obtain the target object.

Figure 7A:
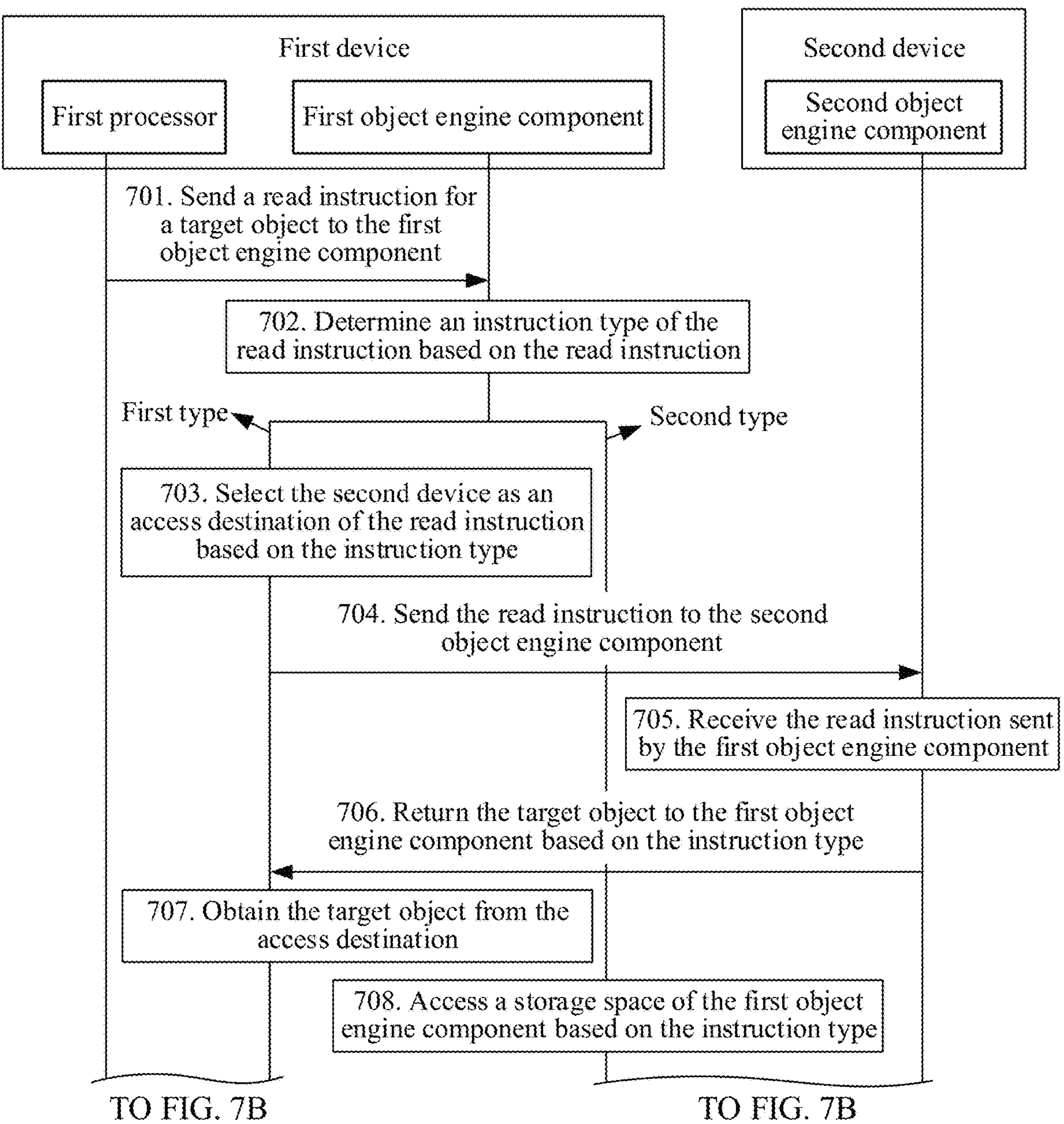
FIG. 7A and FIG. 7B are a flowchart of a data processing method according to an embodiment of this disclosure.
Figure 7B:
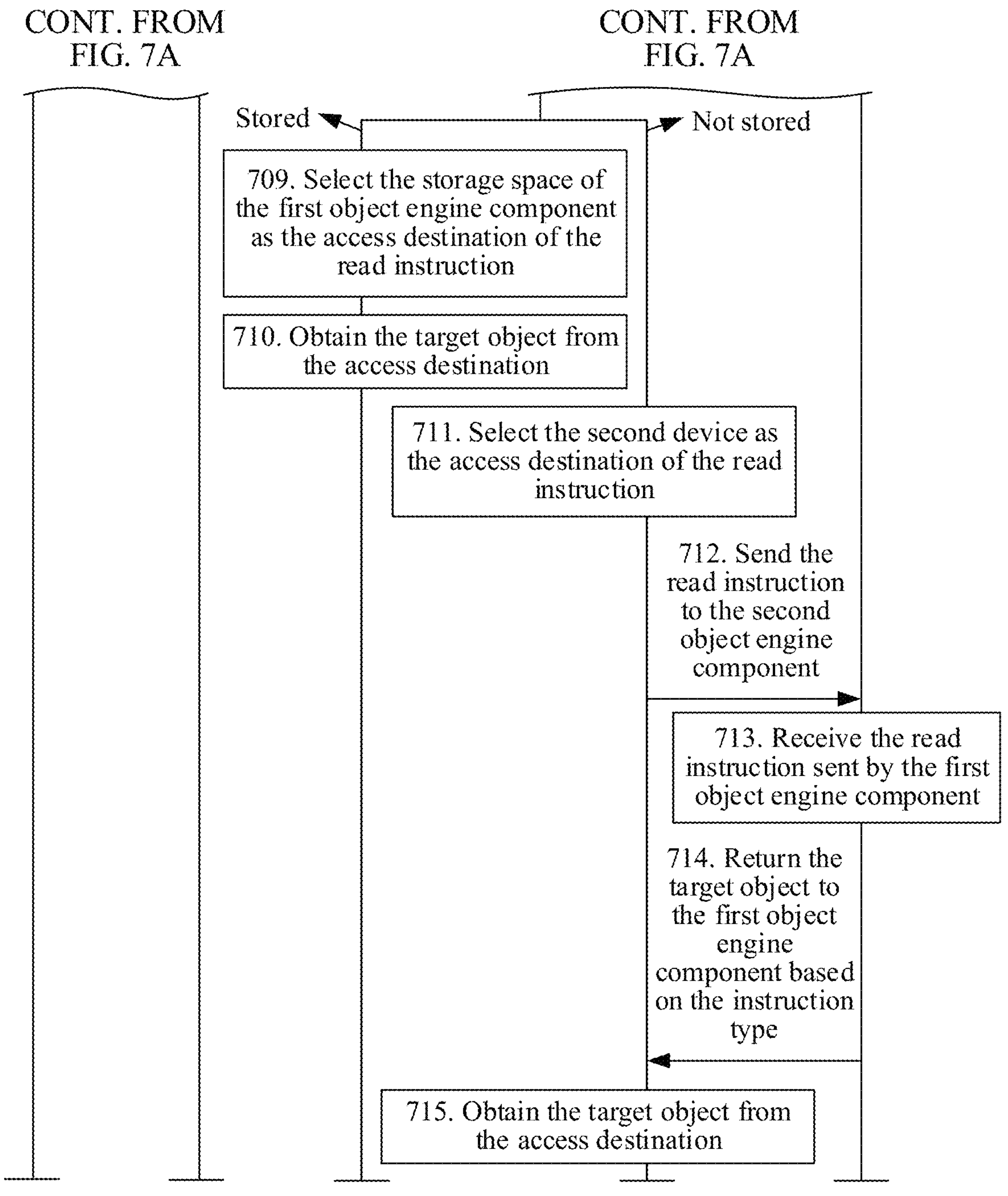

Referring to FIG. 7A and FIG. 7B, the following describes a process in which any device processes a read instruction for a target object in the application scenario shown in FIG. 4.

FIG. 7A and FIG. 7B are a flowchart of a data processing method according to an embodiment of this disclosure. As shown in FIG. 7A and FIG. 7B, interaction between a first device and a second device is used as an example for description. The data processing method is applied to a data processing system. The data processing system includes a first device and a second device. The first device includes a first processor and a first object engine component. The first processor is coupled to the first object engine component. The second device includes a second processor and a second object engine component. The second processor is coupled to the second object engine component. The data processing method includes the following step 701 to step 715.

701. The first processor sends a read instruction for a target object to the first object engine component, where the read instruction includes an instruction type.

In this embodiment of this disclosure, the instruction type includes a first type and a second type. That the instruction type is the first type means that the read instruction is strong-consistency read and is used to obtain a latest version of the target object, indicating that the read instruction is used to obtain the latest version of the target object, and it may also be understood that the first device needs to obtain the latest version of the target object without considering an intermediate cache result. That the instruction type is the second type means that the read instruction is weak-consistency read and is used to obtain any version of the target object, indicating that the read instruction is used to obtain any version of the target object, that is, the first device can obtain the target object, and it may also be understood that the first device can obtain an intermediate cache result.

In some embodiments, the read instruction further includes an object identifier of the target object and a device identifier of the second device. In some embodiments, the read instruction further includes an instruction identifier, used to identify the read instruction (which may also be understood as a function used to distinguish the instruction). In some embodiments, the first device is connected to a terminal by using a wireless network or a wired network, and the first processor sends the read instruction for the target object to the first object engine component in response to an obtaining instruction that is for the target object and that is sent by the terminal.

In some embodiments, the read instruction further includes a second flag bit, and the second flag bit indicates an instruction type of the read instruction. For example, a field name of the second flag bit is "need_cached". When the second flag bit is 0, the instruction type of the read instruction is the first type. When the second flag bit is 1, the instruction type of the read instruction is the second type. In this manner, different consistency read levels can be configured for different services, to satisfy requirements of various services. For example, in a financial service, strong consistency of an object between devices needs to be ensured. Therefore, when data access is performed based on the financial service, the second flag bit of the read instruction is set to 0. In another example, in a web page browsing service, strong consistency of an object between devices does not need to be ensured. Therefore, when data access is performed based on the web page browsing service, the second flag bit device of the read instruction is set to 1. In some embodiments, different consistency areas can be further configured for the data processing system based on different services. For example, a plurality of devices in the data processing system are configured as a first area, and the first area indicates that data access is performed between devices in the area based on the read instruction of the first type. For example, a plurality of devices in the data processing system that are configured to process a financial service are configured as the first area. For example, a plurality of devices in the data processing system are configured as a second area, and the second area indicates that data access is performed between devices in the area based on the read instruction of the second type. For example, a plurality of devices in the data processing system that are configured to process a web page browsing service are configured as the second area. This is not limited in this embodiment of this disclosure.

For example, referring to Table 3, the following describes content of the read instruction by using an example in which the read instruction for the target object includes an instruction identifier, an object identifier of the target object, a device identifier of the second device, and a second flag bit.

TABLE 3

| opcode (Instruction identifier) | object_id (Object identifier) | DLID (Device identifier) | need_cached (Second flag bit) |
|---|---|---|---|
| object_read | 0001 | 02 | 1 |

opcode is an instruction identifier, for example, object_read (object read instruction), object_id is an object identifier of the target object, DLID is a device identifier of the second device, and need_cached is a field name of the second flag bit. It should be noted that Table 3 is merely an example. In some embodiments, the read instruction may further include other content, or content in the instruction is represented in another manner. This is not limited in this embodiment of this disclosure.

702. The first object engine component determines the instruction type of the read instruction based on the read instruction.

In this embodiment of this disclosure, the first object engine component selects an access destination of the read instruction based on the instruction type of the read instruction, and performs the following step 703 to step 707, or performs the following step 708 to step 715. For example, when the read instruction further includes a second flag bit, the first object engine component extracts the second flag bit from the read instruction, and determines the instruction type of the read instruction based on the second flag bit. When the instruction type of the read instruction is the first type, the first object engine component performs the following step 703 to step 707, or when the instruction type of the read instruction is the second type, the first object engine component performs the following step 708 to step 715.

703. The first object engine component selects the second device as an access destination of the read instruction based on the instruction type.

In this embodiment of this disclosure, when the instruction type of the read instruction is the first type, the first object engine component extracts the device identifier of the second device from the read instruction, and selects the second device as the access destination of the read instruction.

704. The first object engine component sends the read instruction to the second object engine component.

705. The second object engine component receives the read instruction sent by the first object engine component.

706. The second object engine component queries object information of the target object based on the instruction type, obtains the target object based on a found storage address of the target object in a memory of the second device, and returns the target object to the first object engine component.

In this embodiment of this disclosure, the second device is a device that creates the target object. It can be learned based on the embodiments shown in FIG. 5 and FIG. 6 that the second object engine component can register the target object with the second object engine component, that is, record the object information of the target object in the second object engine component, where the object information includes the storage address of the target object in the memory of the second device. Based on this, the second object engine component extracts the object identifier of the target object from the read instruction based on the instruction type, queries the object information of the target object based on the object identifier of the target object, to obtain the storage address of the target object in the memory of the second device, obtains the target object from the memory of the second device based on the storage address, and returns the target object to the first object engine component.

707. The first object engine component obtains the target object from the access destination.

Through the foregoing step 703 to step 707, when the instruction type of the read instruction is the first type, the first object engine component directly selects the second device as the access destination based on the instruction type, and sends the read instruction to the second object engine component. After receiving the read instruction, the second object engine component directly obtains the target object from the memory of the second device, thereby ensuring that the version of the obtained target object is the latest version, and satisfying a strong-consistency read requirement.

708. The first object engine component accesses a storage space of the first object engine component based on the instruction type.

In this embodiment of this disclosure, when the instruction type of the read instruction is the second type, it indicates that the first device can obtain the target object. It can be learned based on the application scenario shown in FIG. 4 that, in some embodiments, when the first device and the second device belong to a same snoop group, the second object engine component can synchronize the latest version of the target object to the first object engine component, so that the first object engine stores the received latest version of the target object in the storage space of the first object engine component (this process is described in detail in a subsequent embodiment shown in FIG. 11, and details are not described herein again). Based on this, the first object engine component accesses the storage space of the first object engine component based on the object identifier of the target object in the read instruction. If the first object engine component stores the target object, the following step 709 and step 710 are performed. If the first object engine component does not store the target object, the following step 711 and step 712 are performed.

709. The first object engine component selects the storage space of the first object engine component as the access destination of the read instruction.

710. The first object engine component obtains the target object from the access destination.

Through the foregoing step 708 to step 710, when the instruction type of the read instruction is the second type, and the target object is stored in the storage space of the first object engine component, the first object engine component can directly obtain the target object from its own storage space based on the instruction type, to shorten a path of obtaining the target object, and improve data access efficiency.

711. The first object engine component selects the second device as the access destination of the read instruction.

712. The first object engine component sends the read instruction to the second object engine component.

713. The second object engine component receives the read instruction sent by the first object engine component.

714. The second object engine component queries object information of the target object based on the instruction type, obtains the target object based on a found storage address of the target object in a storage space of the second object engine component, and returns the target object to the first object engine component.

In this embodiment of this disclosure, the object engine component of the second device extracts the object identifier of the target object from the read instruction based on the instruction type, queries the object information of the target object based on the object identifier of the target object, to obtain the storage address of the target object in the storage space of the second object engine component, obtains the target object from the storage space of the second object engine component based on the found storage address, and returns the target object to the first object engine component. In some embodiments, when the storage address of the target object in the storage space of the second object engine component is not found, the second object engine component obtains the storage address of the target object in the memory of the second device from the object information of the target object based on the object identifier of the target object, obtains the target object from the memory based on the storage address in the memory, and returns the target object to the first object engine component.

715. The first object engine component obtains the target object from the access destination.

Through the foregoing step 711 to step 715, when the instruction type of the read instruction is the second type, and the target object is not stored in the storage space of the first object engine component, the first object engine component can select, based on the instruction type, the second device as the access destination of the read instruction, to obtain the target object from the second device, thereby satisfying a weak-consistency read requirement.

In addition, through the foregoing step 708 to step 715, when the instruction type of the read instruction is the second type, the first object engine component first accesses its own storage space based on the instruction type, and selects, if the target object is stored in its own storage space, its own storage space as the access destination, or selects, if the target object is not stored in its own storage space, the second device that creates the target object as the access destination, thereby ensuring that the first device can obtain any version of the target object as soon as possible, and satisfying a weak-consistency read requirement.

It should be noted that the foregoing step 702 to step 715 are an optional implementation provided in this embodiment of this disclosure. To be specific, for read instructions of different instruction types, the target object is obtained in different manners. In some embodiments, when receiving the read instruction that is for the target object and that is sent by the first processor, the first object engine component can directly determine that the access destination of the read instruction is the second device, and send the read instruction to the second object engine component. This is not limited in this embodiment of this disclosure.

In some embodiments, the first object engine component stores the target object obtained from the second device in the storage space of the first object engine component. For example, when the target object is not stored in the storage space of the first object engine component, the first object engine component stores the obtained target object in the storage space of the object engine component. Alternatively, when an old version of the target object is stored in the storage space of the first object engine component, the first object engine component stores the obtained target object in the storage space of the first object engine component. A case that the first object engine component stores the target object is not limited in this embodiment of this disclosure. For example, the first object engine component records the object information of the target object in the first object engine component, and the object information includes the storage address of the target object in the storage space of the first object engine component. In this manner, the first object engine component can store the obtained target object in its own storage space in time, and therefore can obtain, when subsequently receiving the read instruction for the target object again, the target object directly from its own storage space, thereby improving data access efficiency.

Through the foregoing step 701 to step 715, a process in which any device in the data processing system processes the read instruction for the target object is described. This process may also be understood as a process in which an object engine component in a device processes an object read instruction. The following describes an example of this process with reference to the schematic diagram of the hardware structure of the object engine component shown in FIG. 3.

Figure 8:
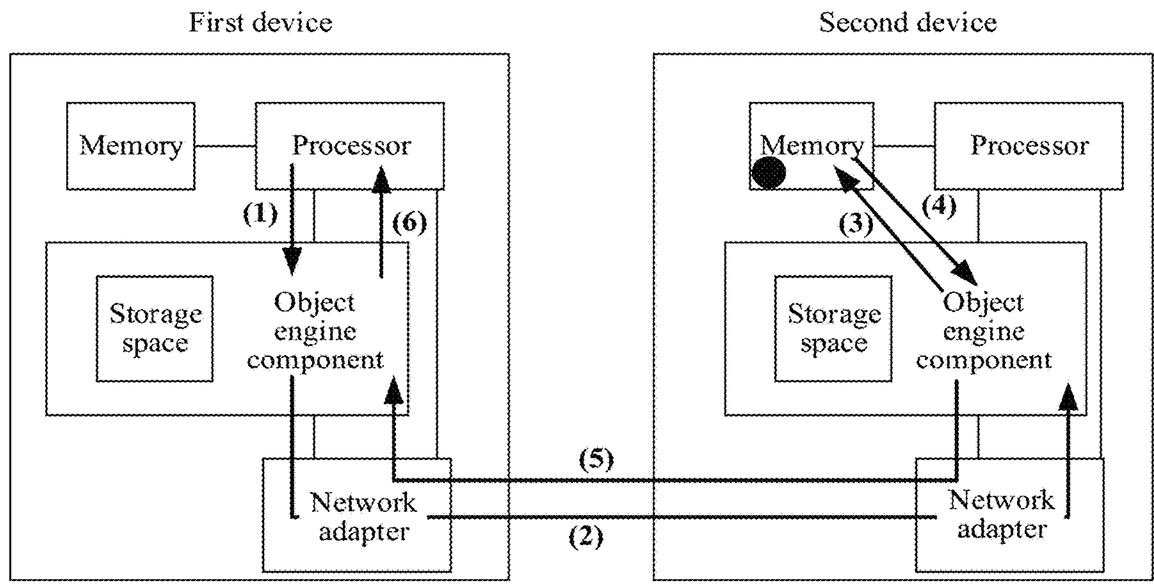
FIG. 8 is a schematic diagram of an object read instruction processing process according to an embodiment of this disclosure.

For example, FIG. 8 is a schematic diagram of an object read instruction processing process according to an embodiment of this disclosure. As shown in FIG. 8, an example in which an instruction type of a read instruction for a target object is a first type is used. The object read instruction processing process includes the following several steps: (1) A first processor sends a read instruction for a target object to a first object engine component. (2) The first object engine component selects a second device as an access destination of the read instruction based on the instruction type, and sends the read instruction to a second object engine component. For example, this process is implemented by using a network adapter having an RDMA function. (3) The second object engine component queries object information of the target object based on the instruction type, to obtain a storage address of the target object in a memory of the second device. (4) The second object engine component obtains the target object from the memory of the second device. (5) The second object engine component sends the target object to the first object engine component. (6) The first object engine component receives the target object, and returns the target object to the first processor.

Figure 9:
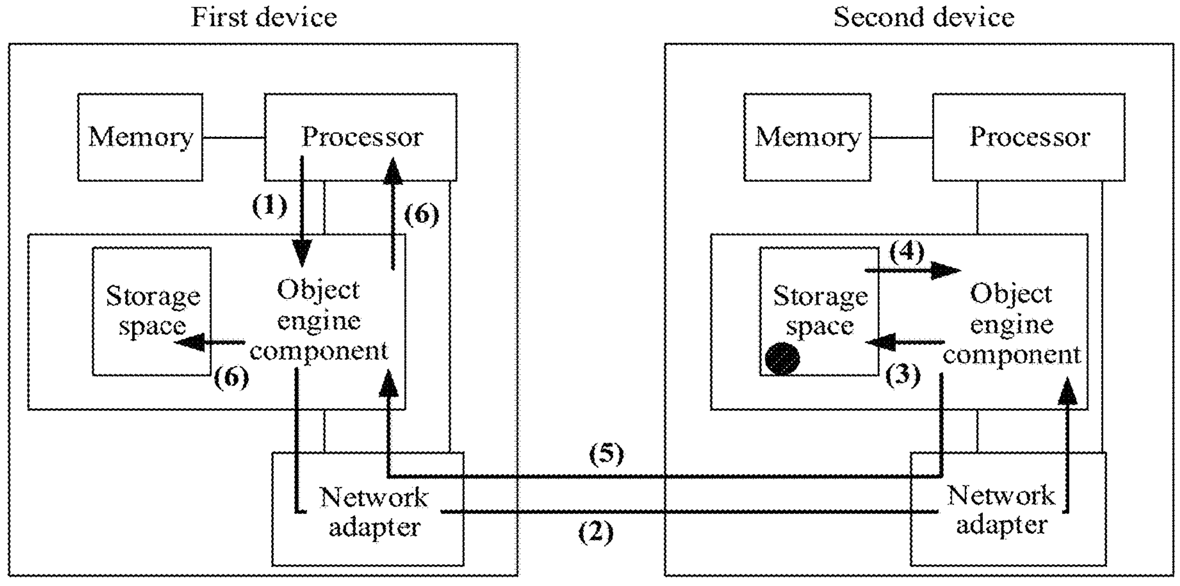
FIG. 9 is a schematic diagram of another object read instruction processing process according to an embodiment of this disclosure.

For example, FIG. 9 is a schematic diagram of another object read instruction processing process according to an embodiment of this disclosure. As shown in FIG. 9, an example in which an instruction type of a read instruction for a target object is a second type is used. The object read instruction processing process includes the following several steps: (1) A first processor sends a read instruction for a target object to a first object engine component. (2) The first object engine component accesses a storage space of the first object engine component based on the instruction type, selects, if the target object is not stored in the storage space of the first object engine component, a second device as an access destination of the read instruction, and sends the read instruction to a second object engine component. For example, this process is implemented by using a network adapter having an RDMA function. (3) The second object engine component queries object information of the target object based on the instruction type, to obtain a storage address of the target object in a storage space of the second object engine component. (4) The second object engine component obtains the target object from the storage space. (5) The second object engine component sends the target object to the first object engine component. (6) The first object engine component receives the target object, returns the target object to the first processor, and stores the target object in the storage space of the first object engine component.

Figure 10:
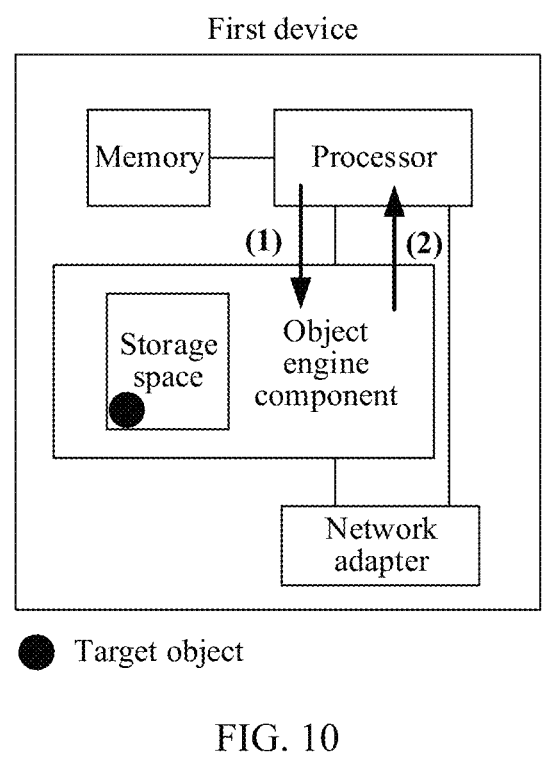

For example, FIG. 10 is a schematic diagram of another object read instruction processing process according to an embodiment of this disclosure. As shown in FIG. 10, an example in which an instruction type of a read instruction for a target object is a second type is used. The object read instruction processing process includes the following several steps: (1) A first processor sends a read instruction for a target object to a first object engine component. (2) The first object engine component accesses a storage space of the first object engine component in response to the read instruction, selects, if the target object is stored in the storage space of the first object engine component, the storage space of the first object engine component as an access destination of the read instruction, obtains the target object from the storage space of the first object engine component, and returns the target object to the first processor.

FIG. 7A and FIG. 7B to FIG. 10 show a process in which any device in the data processing system implements data access. In this manner, when intending to obtain the target object created by the second device, the first device can communicate with the second object engine component of the second device by using the first object engine component of the first device, thereby quickly obtaining the target object, implementing a data access process in which an access destination is flexibly selected based on an instruction type, greatly increasing a speed of data access between devices, and improving data access efficiency. Further, different consistency read levels can be configured for different services, thereby satisfying requirements of various services.

Figure 11:
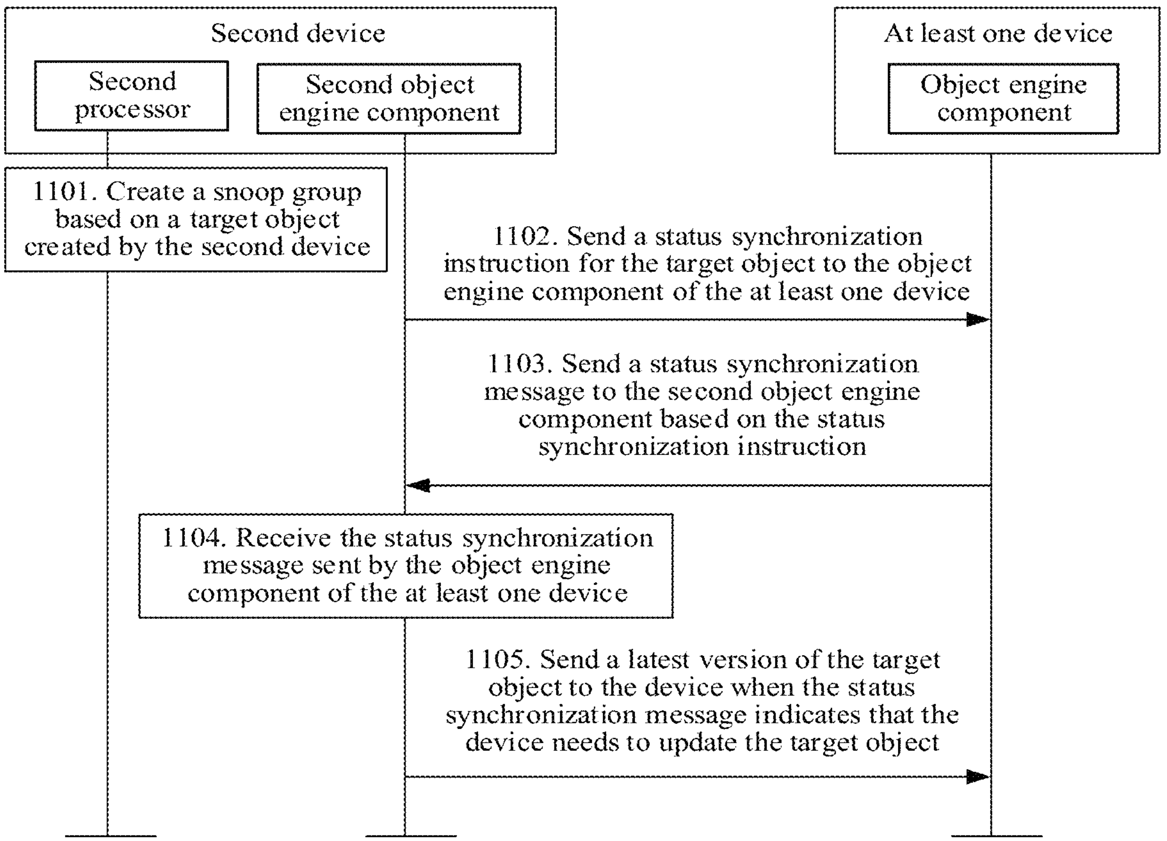
FIG. 11 is a flowchart of an object status synchronization method according to an embodiment of this disclosure.

Referring to FIG. 11, the following describes a process in which a second device synchronizes a latest version of a target object to another device in a same snoop group to implement object status synchronization in the application scenario shown in FIG. 4.

FIG. 11 is a flowchart of an object status synchronization method according to an embodiment of this disclosure. As shown in FIG. 11, interaction between a second device and at least one device is used as an example for description. In this manner, data consistency between a plurality of devices in a data processing system can be ensured. For example, the object status synchronization method includes the following step 1101 to step 1105.

1101. A second processor creates a snoop group based on a target object created by the second device.

In this embodiment of this disclosure, the second processor determines at least one device in the data processing system based on the target object, and creates a snoop group based on the second device and the at least one device by using the second object engine component. In some embodiments, the at least one device is configured to store a copy of the target object, that is, the second processor determines the at least one device based on a device in which at least one copy of the target object is located.

In some embodiments, a snoop group management center is further configured in the data processing system shown in FIG. 4. The second processor sends a snoop group creation application for the snoop group to the snoop group management center based on the device identifier of the second device and a device identifier of the at least one device, where the snoop group creation application instructs the second device to apply for creating the snoop group. The snoop group management center returns a snoop group identifier of the snoop group to the second processor based on the snoop group creation application. After receiving the snoop group identifier of the snoop group, the second processor sends a snoop group registration instruction for the snoop group to the second object engine component, where the snoop group registration instruction instructs to register the snoop group with the second object engine component. The second object engine component records snoop group information of the snoop group in the second object engine component based on the snoop group registration instruction.

In some embodiments, the snoop group information of the snoop group includes the snoop group identifier of the snoop group, an object status synchronization period, the number of devices in the snoop group, a device identifier of each device, and the like. This is not limited in this embodiment of this disclosure. The object status synchronization period indicates a period in which the second device synchronizes a status of the target object to the at least one device. For example, the following describes an example of content of the snoop group information of the snoop group with reference to Table 4.

TABLE 4

| snoop_id (Snoop group identifier) | time_out (Object status synchronization period) | num (number) | DLID0 (Device identifier) | DLID1 (Device identifier) | . . . | DLIDN (Device identifier) |
|---|---|---|---|---|---|---|
| 001 | 1 min | 10 | 0000 | 0001 | | 000N |

snoop_id is a snoop group identifier of the snoop group, for example, 001, time_out is an object status synchronization period, for example, 1 min, num is the number of devices in the snoop group, for example, 10, and DLID0 to DLIDN are device identifiers of the devices. It should be noted that Table 4 is merely an example. In some embodiments, the snoop group information may further include other content, or content in the snoop group information is represented in another manner. This is not limited in this embodiment of this disclosure.

In addition, in some embodiments, the second processor can further join any snoop group by sending an application instruction for the snoop group to the snoop group management center. For example, that any snoop group is a target snoop group is used as an example. The second processor sends an application instruction for the target snoop group to the snoop group management center, where the application instruction instructs the second device to request to join the target snoop group. In some embodiments, the second processor can further exit any snoop group by sending an exit instruction for the snoop group to the snoop group management center. For example, that any snoop group is a target snoop group is still used as an example. The second processor sends an exit instruction for the target snoop group to the snoop group management center, where the exit instruction instructs the second device to request to exit the target snoop group. It should be noted that any device can join or exit any snoop group by sending the foregoing application instruction or exit instruction to the snoop group management center.

Through the foregoing step 1101, a process in which the second device creates a snoop group based on the target object created by the second device is described. The snoop group is created, so that the second object engine component synchronizes a latest version of the target object to another device in the snoop group, thereby implementing an object status synchronization function. Further, this manner of creating a snoop group avoids a case that the second device performs global synchronization for a status of an object, and therefore is applicable to different types of services, and reduces software overheads, and improves data processing efficiency. The following describes an example of this process with reference to the schematic diagram of the hardware structure of the object engine component shown in FIG. 3.

Figure 12:
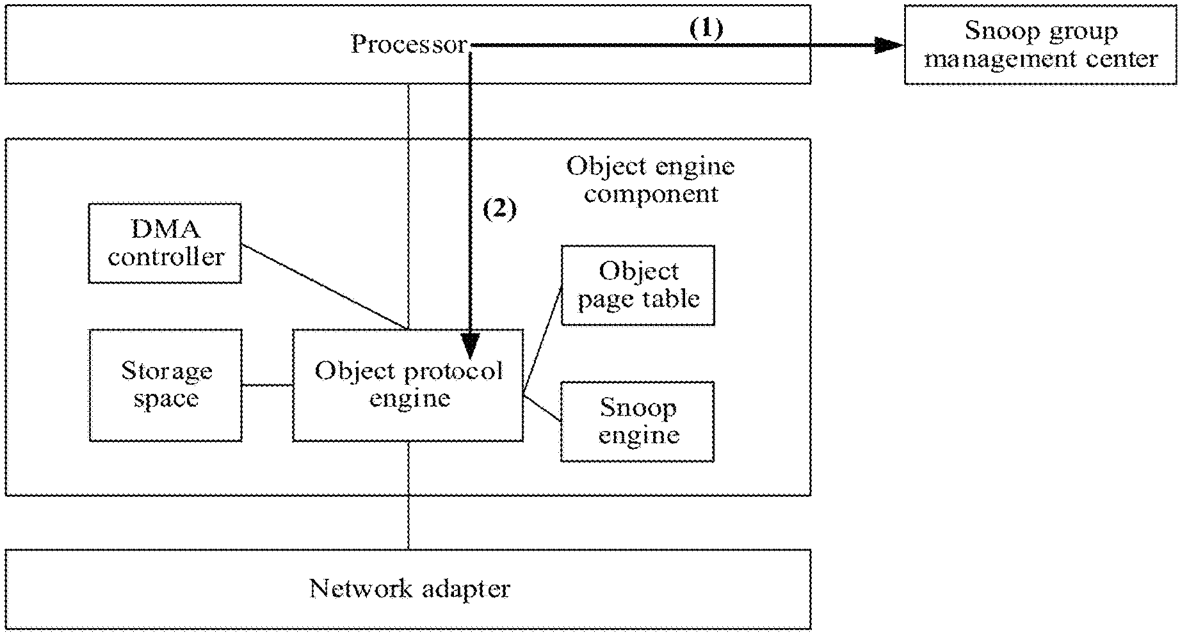
FIG. 12 is a schematic diagram of a snoop group creation process according to an embodiment of this disclosure.

For example, FIG. 12 is a schematic diagram of a snoop group creation process according to an embodiment of this disclosure. As shown in FIG. 12, that a snoop group management center is further configured in the foregoing data processing system is used as an example. The snoop group creation process includes the following steps: (1) The second processor sends a snoop group creation application for the snoop group to the snoop group management center based on the device identifier of the second device and a device identifier of the at least one device. (2) After receiving the snoop group identifier of the snoop group returned by the snoop group management center, the second processor sends a snoop group registration instruction for the snoop group to the second object engine component, and the second object engine component records the snoop group information of the snoop group in the second object engine component based on the snoop group registration instruction.

It should be noted that in the foregoing step 1101, that the second device creates the snoop group is used as an example for description. In some embodiments, the snoop group may alternatively be created by another device. In some other embodiments, the snoop group may alternatively be created by the snoop group management center based on an actual requirement. This is not limited in this embodiment of this disclosure.

1102. The second object engine component sends a status synchronization instruction for the target object to an object engine component of the at least one device, where the status synchronization instruction includes a version number of a latest version of the target object.

In this embodiment of this disclosure, the second device and the at least one device belong to a same snoop group, and when the version of the target object is updated, the second object engine component sends the status synchronization instruction to the object engine component of the at least one device in the snoop group. In some embodiments, when the snoop group information of the snoop group includes the object status synchronization period, the second object engine component periodically sends the status synchronization instruction to the at least one device based on the object status synchronization period. An occasion on which the second device sends the status synchronization instruction is not limited in this embodiment of this disclosure.

In some embodiments, the status synchronization instruction includes an instruction identifier, used to identify the status synchronization instruction (which may also be understood as a function used to distinguish the instruction). In some embodiments, the status synchronization instruction further includes a snoop group identifier of the snoop group. For example, the following describes an example of content of the status synchronization instruction with reference to Table 5.

TABLE 5

| opcode (Instruction identifier) | object_id (Object identifier) | snoop_id (Snoop group identifier) | new_version (Version number of a latest version) |
|---|---|---|---|
| snoop_req | 0001 | A1 | 03 |

opcode is an instruction identifier, for example, snoop_req (object status synchronization instruction), object_id is an object identifier of the target object, snoop_id is a snoop group identifier of the snoop group, for example, A1, and new_version is a version number of a current version of the target object, that is, a version number of a latest version of the target object, for example, 03. It should be noted that Table 5 is merely an example. In some embodiments, the status synchronization instruction may further include other content, or content in the status synchronization instruction is represented in another manner. This is not limited in this embodiment of this disclosure.

1103. The object engine component of the at least one device sends a status synchronization message to the second object engine component based on the status synchronization instruction, where the status synchronization message indicates whether the device needs to update the target object.

In this embodiment of this disclosure, for any one of the at least one device, an object engine component of the device sends, in response to the status synchronization instruction and based on the version number of the target object stored in the device, a status synchronization message to the object engine component of the first device. That is to say, when the version of the target object stored in the device is earlier than the version of the target object in the status synchronization instruction, it indicates that the device needs to update the target object. When the version of the target object stored in the device is the same as the version of the target object in the status synchronization instruction, it indicates that the device does not need to update the target object.

In some embodiments, the status synchronization message includes a third flag bit, and the third flag bit indicates whether the device needs to update the target object. For example, a field name of the third flag bit is "ack". When the third flag bit is 0, it indicates that the device does not need to update the target object. When the third flag bit is 1, it indicates that the device needs to update the target object.

For example, the following describes an example of content of the status synchronization message with reference to Table 6 by using an example in which the status synchronization message includes the third flag bit.

TABLE 6

| opcode (Instruction identifier) | object_id (Object identifier) | DLID (Device identifier) | ack (Third flag bit) |
|---|---|---|---|
| snoop_response | 0001 | 02 | 1 |

opcode is an instruction identifier, for example, snoop_response (object status synchronization message), object_id is an object identifier of the target object, DLID is a node identifier of the second device, and ack is a field name of the third flag bit. It should be noted that Table 6 is merely an example. In some embodiments, the status synchronization message may further include other content, or content in the status synchronization message is represented in another manner. This is not limited in this embodiment of this disclosure.

1104. The second object engine component receives the status synchronization message sent by the object engine component of the at least one device.

1105. The second object engine component sends a latest version of the target object to the device when the status synchronization message indicates that the device needs to update the target object.

Through the foregoing step 1101 to step 1105, a process in which the second device synchronizes the latest version of the target object to another device in the same snoop group is described. This process may also be understood as a process in which the object engine component implements an object status synchronization function. The snoop group is created, so that the second object engine component synchronizes a latest version of the target object to another device in the snoop group, thereby implementing an object status synchronization function.

It should be noted that the foregoing manner of creating a snoop group is an optional implementation provided in this embodiment of this disclosure. In some embodiments, the second device does not need to create a snoop group. That is to say, the second device sends, when a version of the target object is updated or periodically, a status synchronization instruction for the target object to a device other than the second device in the data processing system. This is not limited in this embodiment of this disclosure.

The following describes an example of the foregoing process with reference to the schematic diagram of the hardware structure of the object engine component shown in FIG. 3.

Figure 13:
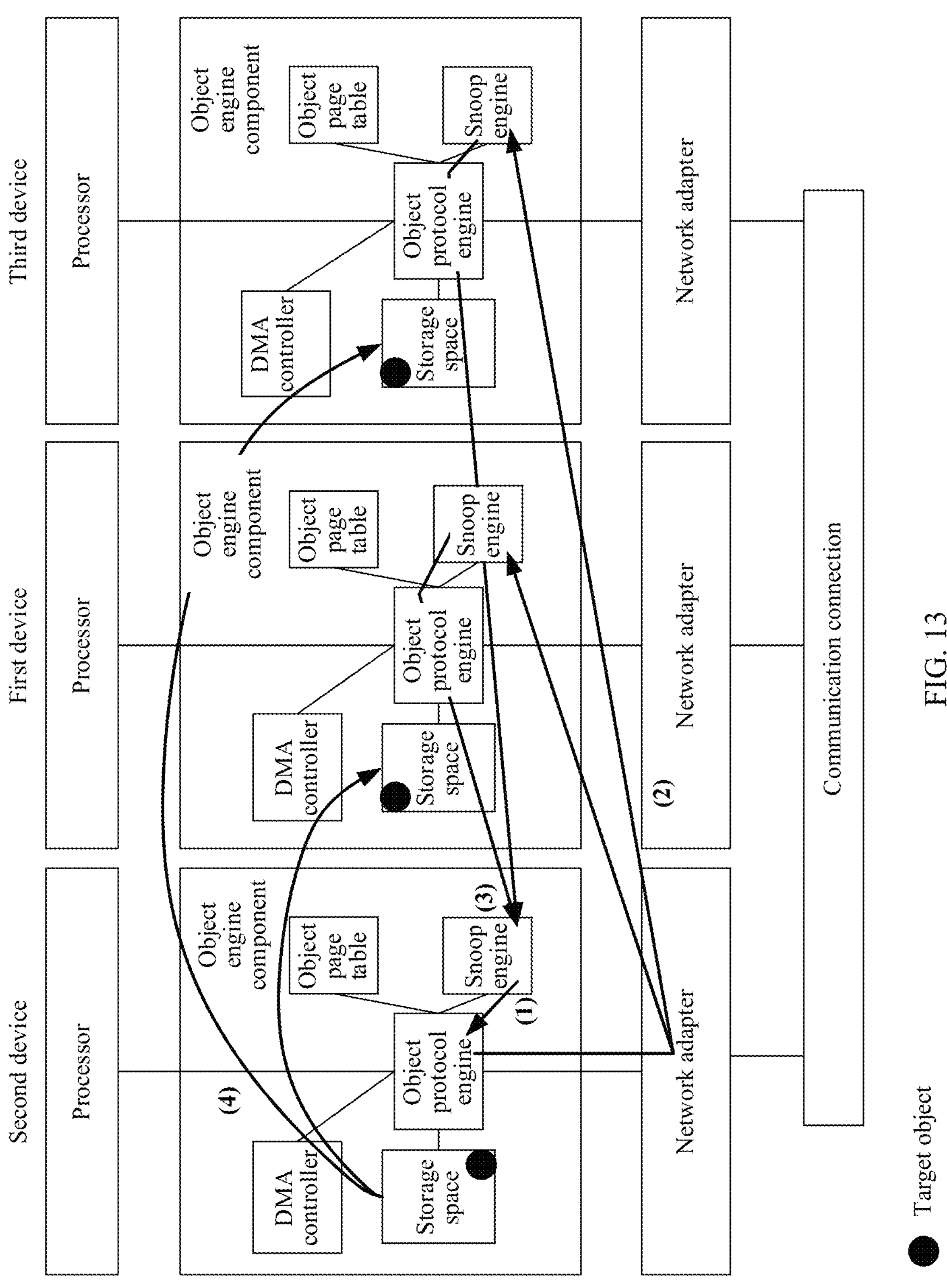
FIG. 13 is a schematic diagram of an object status synchronization process according to an embodiment of this disclosure.

For example, FIG. 13 is a schematic diagram of an object status synchronization process according to an embodiment of this disclosure. As shown in FIG. 13, an example in which a snoop group includes a second device, a first device, and a third device is used. The object status synchronization process includes the following steps: (1) A second object engine component determines an object status synchronization period of a target object based on snoop group information of the snoop group, and generates a status synchronization instruction for the target object. For example, this process is performed by a snoop engine in the second object engine component, and the snoop engine sends, based on the status synchronization period, the status synchronization instruction to an object protocol engine in the second object engine component. (2) The second object engine component sends the status synchronization instruction to a first object engine component of the first device and a third object engine component of the third device. For example, this process is implemented by using a network adapter having an RDMA function. (3) The first object engine component and the third object engine component send a status synchronization message to the second object engine component in response to the status synchronization instruction. For example, this process is performed by a snoop engine in the first object engine component and a snoop engine in the third object engine component. (4) When the status synchronization message indicates that the first device and the third device need to update the target object, the second object engine component sends a latest version of the target object to the first device and the third device.

FIG. 10 to FIG. 13 show a process in which the second device synchronizes the latest version of the target object to another device in the same snoop group. In this manner, the second object engine component can synchronize the latest version of the target object to another device, to implement an object status synchronization function, thereby ensuring data consistency between a plurality of devices in the data processing system.

Figure 14:
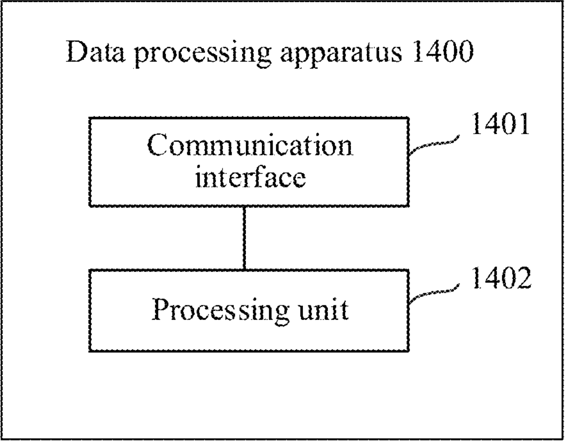
FIG. 14 is a schematic diagram of a structure of a data processing apparatus according to an embodiment of this disclosure.

FIG. 14 is a schematic diagram of a structure of a data processing apparatus according to an embodiment of this disclosure. The data processing apparatus may implement some or all functions of the first object engine component of the first device in the foregoing embodiments, and/or implement some or all functions of the second object engine component of the second device in the foregoing embodiments. The data processing apparatus may be a chip or a board that includes any one of the foregoing object engine components. The data processing apparatus includes a communication interface 1401 and a processing unit 1402. The communication interface 1401 may be an interface of a chip, and is configured to exchange an instruction or information with another chip or device. The processing unit 1402 may be hardware logic configured to process an instruction. The processing unit 1402 may be configured to implement functions of the first object engine component and/or the second object engine component described in the foregoing embodiments.

In this disclosure, the terms “first”, “second”, and the like are used to distinguish between same or similar items whose effects and functions are basically the same. It should be understood that there is no logical or time-sequence dependency among “first”, “second”, and “n$^{th}$”, and a quantity and an execution sequence are not limited. It should be further understood that although the terms such as “first” and “second” are used in the following description to describe various elements, these elements should not be limited by the terms. These terms are merely used to distinguish one element from another element. For example, a first device may be referred to as a second device, and similarly, a second device may be referred to as a first device without departing from the scope of the various examples. Both the first device and the second device may be devices, and in some cases, may be separate and different devices.

The term “at least one” in this disclosure means one or more, and the term “a plurality of” in this disclosure means two or more. For example, a plurality of devices means two or more devices.

The foregoing descriptions are merely specific implementations of this disclosure, but are not intended to limit the protection scope of this disclosure. Any equivalent modification or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. A method comprising:

receiving, by a first object engine component of a first device of a data processing system, a read instruction that is for a target object and that is from a first processor of the first device, wherein the read instruction comprises an instruction type, wherein the instruction type indicates a strong-consistency read or a weak-consistency read, wherein the strong-consistency read indicates that the read instruction is to obtain a latest version of the target object, and wherein the weak-consistency read indicates that the read instruction is to obtain any version of the target object;

selecting, by the first object engine component, an access destination of the read instruction based on the instruction type; and obtaining, by the first object engine component, the target object from the access destination.

2. The method of claim 1, wherein when the instruction type is a first type indicating the strong-consistency read, selecting the access destination comprises selecting, by the first object engine component, a second device of the data processing system as the access destination.

3. The method of claim 1, wherein when the instruction type is a second type indicating the weak-consistency read, selecting the access destination comprises:

accessing, by the first object engine component, a first storage space of the first object engine component;

selecting, by the first object engine component, the first storage space as the access destination when the target object is stored in the first storage space; and selecting, by the first object engine component, a second device of the data processing system as the access destination when the target object is not stored in the first storage space, wherein the second device creates the target object.

4. The method of claim 3, wherein when the target object is not stored in the first storage space, the method further comprises:

receiving, by a second object engine component of the second device, the read instruction from the first object engine component;

querying, by the second object engine component, object information of the target object based on the instruction type;

obtaining the target object based on a found storage address of the target object in a second storage space of the second object engine component; and returning the target object to the first object engine component.

5. The method of claim 2, further comprising:

receiving, by a second object engine component of the second device, the read instruction from the first object engine component;

querying, by the second object engine component, object information of the target object based on the instruction type;

obtaining the target object based on a found storage address of the target object in a memory of the second device; and returning the target object to the first object engine component.

6. The method of claim 2, further comprising:

receiving, by a second object engine component of the second device, an object registration instruction from a second processor of the second device, wherein the object registration instruction instructs to register the target object with the second object engine component; and recording, by the second object engine component, object information of the target object in the second object engine component based on the object registration instruction, wherein the object information comprises a first storage address of the target object in a memory of the second device.

7. The method of claim 6, further comprising:

obtaining, by the second object engine component, the target object from the memory; and storing, by the second object engine component, the target object in a second storage space of the second object engine component, wherein the object information further comprises a second storage address of the target object in the second storage space.

8. The method of claim 2, further comprising storing, by the first object engine component, the target object from the second device in a first storage space of the first object engine component.

9. The method of claim 2, further comprising synchronizing, by a second object engine component of the second device, the latest version of the target object to the first object engine component, wherein the first device and the second device are in a same snoop group.

10. A computing device, comprising:

one or more processors configured to send a read instruction for a target object, wherein the read instruction comprises an instruction type, wherein the instruction type indicates a strong-consistency read or a weak-consistency read, wherein the strong-consistency read indicates that the read instruction is to obtain a latest version of the target object, and wherein the weak-consistency read indicates that the read instruction is to obtain any version of the target object;

an object engine component coupled to the one or more processors and configured to:

receive the read instruction;

select an access destination of the read instruction based on the instruction type; and obtain the target object from the access destination.

11. The computing device of claim 10, wherein when the instruction type is a first type indicating the strong-consistency read, the object engine component is further configured to select a second device as the access destination, and wherein the second device creates the target object.

12. The computing device of claim 10, wherein when the instruction type is a second type indicating the weak-consistency read, the object engine component is further configured to:

access a storage space of the object engine component;

select the storage space as the access destination if the target object is stored in the storage space; and select a second device as the access destination if the target object is not stored in the storage space, wherein the second device creates the target object.

13. The computing device of claim 11, wherein the object engine component is further configured to store the target object from the second device in a storage space of the object engine component.

14. The computing device of claim 10, further comprising a network adapter, wherein the object engine component is disposed in the network adapter.

15. A computing device comprising:

a memory configured to store a target object; and an object engine component coupled to the memory, comprising a storage space, and configured to:

receive a read instruction that is for the target object and that is from a request device, wherein the read instruction comprises an instruction type, wherein the instruction type indicates a strong-consistency read or a weak-consistency read, wherein the strong-consistency read indicates that the read instruction is to obtain a latest version of the target object, and wherein the weak-consistency read indicates that the read instruction is to obtain any version of the target object;

obtain, based on the instruction type, the target object from the storage space or the memory; and return the target object to a second object engine component of the request device.

16. The computing device of claim 15, wherein the object engine component is further configured to:

query object information of the target object;

obtain the target object from the memory based on a first found storage address of the target object in the memory when the instruction type is a first type; and obtain the target object from the storage space based on a second found storage address of the target object in the storage space when the instruction type is a second type.

17. The computing device of claim 15, further comprising one or more processors, and wherein the object engine component is further configured to:

receive, from the one or more processors, an object registration instruction for the target object, wherein the object registration instruction instructs to register the target object with the object engine component; and record, based on the object registration instruction, object information of the target object in the object engine component, wherein the object information comprises a first storage address of the target object in the memory.

18. The computing device of claim 17, wherein the object engine component is further configured to:

obtain the target object from the memory; and store the target object in the storage space, wherein the object information further comprises a second storage address of the target object in the storage space.

19. The computing device of claim 15, wherein the computing device is in a snoop group, wherein the snoop group further comprises a second computing device, and wherein the object engine component is further configured to synchronize a latest version of the target object to a third object engine component in the second computing device.

20. The computing device of claim 10, further comprising an input/output (I/O) chip, wherein the object engine component is disposed in the I/O chip.

* * * * *